(12) United States Patent
Lee

(10) Patent No.: US 6,623,197 B1
(45) Date of Patent: Sep. 23, 2003

(54) WATER-BASED SOLID MARKING COMPOSITION, METHOD FOR PRODUCING THE SAME, AND WATER-BASED MARKING INSTRUMENT CONTAINING THE SAME

(75) Inventor: Eun-sung Lee, Seoul (KR)

(73) Assignee: Amos Corporation, Seoul (KR)

( * ) Notice: Subject to any disclaimer, the term of this patent is extended or adjusted under 35 U.S.C. 154(b) by 0 days.

(21) Appl. No.: 10/302,565

(22) Filed: Nov. 22, 2002

(30) Foreign Application Priority Data

Mar. 6, 2002 (KR) .................................. 2002-0011946

(51) Int. Cl.$^7$ .......................... B43K 21/08; C09D 11/16
(52) U.S. Cl. .......................... 401/72; 401/75; 401/175; 523/160; 523/164
(58) Field of Search .......................... 401/72, 75, 174, 401/175; 523/164, 160, 161

(56) References Cited

U.S. PATENT DOCUMENTS

| | | | |
|---|---|---|---|
| 3,917,417 A | * 11/1975 | Lang | 401/72 |
| 4,545,696 A | * 10/1985 | Carluccio | 401/175 |
| 5,288,160 A | * 2/1994 | Li et al. | 523/160 X |
| 6,046,253 A | * 4/2000 | Erdtmann et al. | 523/160 |
| 6,117,921 A | * 9/2000 | Ma et al. | 523/161 |
| 6,127,453 A | * 10/2000 | Erdtmann et al. | 523/160 |
| 6,174,938 B1 | * 1/2001 | Miller et al. | 523/164 |
| 6,481,909 B2 | * 11/2002 | Lee | 401/75 X |

FOREIGN PATENT DOCUMENTS

| | | |
|---|---|---|
| JP | 06-313146 | 11/1994 |
| JP | 07-216288 | 8/1995 |
| JP | 09-058176 | 3/1997 |
| JP | 11-172188 | 6/1999 |
| JP | 2001-240790 | 9/2001 |

* cited by examiner

Primary Examiner—Gregory L. Huson
Assistant Examiner—Kathleen J. Prunner
(74) Attorney, Agent, or Firm—Merchant & Gould P.C.

(57) ABSTRACT

A water-based solid marking composition comprises water, a humectant and a solidifying agent present in the weight ratio of 2~3:1~2:1. A water-based marking instrument comprising the water-based solid marking composition includes a body surrounding the water-based solid marking composition, a packing for supporting the lower portion of the water-based solid marking composition and for assisting the transportation of the water-based solid marking composition, and a screw facing the packing so as to move the packing upwardly and downwardly, which have advantages in color miscibility, affinity to paper, usability, color tone, less sludge on paper and removal of stains on undesired sites, can render watercolor images using a crayon pastel, a crayon, a colored pencil or a marker, can prevent the composition from feeling sticky in a user's hands and conserves resources, and protects our environment.

20 Claims, 2 Drawing Sheets

(a)  (b)

(a)          (b)

WATER-BASED SOLID MARKING COMPOSITION, METHOD FOR PRODUCING THE SAME, AND WATER-BASED MARKING INSTRUMENT CONTAINING THE SAME

BACKGROUND OF THE INVENTION

1. Field of the Invention

The present invention relates to a water-based solid marking composition which may be used for drawing a painting or marking in the form of a crayon, a crayon pastel, a colored pencil or a marker, a method for producing the water-based solid marking composition, and a water-based marking instrument containing the water-based solid marking composition. More specifically, the present invention relates to a water-based solid marking composition comprising a colorant for expressing a color and a solidifying agent for solidifying components of the composition without any organic solvent. In particular, water, a humectant and a solidifying agent in the composition is preferably present in the weight ratio of 2~3:1~2:1.

The water-based solid marking composition can solve disadvantages of conventional oil-based marking compositions and further exhibit new functions without using any organic solvents.

2. Description of the Related Art

Conventional oil-based solid marking compositions such as oil-based crayon pastels or oil-based colored pencils have problems in color miscibility and affinity to paper. Also, the conventional oil-based solid marking compositions are too hard to apply to paper, express poor color tone, leave sludge on paper, and leave stains on user's skin or clothing, which are not easily removable. Furthermore, using the conventional oil-based marking compositions, it is impossible to render watercolor images.

Crayon pastels and solid dyestuffs are now commercially available in the market, but since these products have unique characteristics, they are not chemically compatible with each other. In the case of crayon pastels, the same components have been used to produce the products over a long time period and therefore there is no noteworthy change in their functions. In addition, since solid dyestuffs must be added with water as a solvent to draw a painting, they lose their original qualities. In the case of crayon pastels, all components are oily and their crystallinity is relatively small. Accordingly, crayon pastels are suitable for drawing a painting. However, crayon pastels have one drawback that they can stain user's hands or the like as they are applied to paper. If crayon pastels are produced in order not to avoid staining, they show poor affinity to paper to be applied. In particular, mixing with other components such as pigments during production of solid dyestuffs must be carefully carried out due to the strong crystallinity of solid dyestuffs. When a user intends to weaken the crystallinity (agglomerate) of solid dyestuffs to draw a painting, he must dissolve solid dyestuffs in water.

Therefore, there is a need for a marking composition that has excellent color miscibility, easy usability, distinctive color tone and easy removal of stains on clothes or hands. In addition, there is another need for a marking composition capable of rendering watercolor images using brush and water after applying the composition.

SUMMARY OF THE INVENTION

Therefore, the present invention has been made in view of the above-mentioned problems, and it is an object of the present invention to provide a water-based solid marking composition which has excellent color miscibility, good affinity to paper, easy usability, distinctive color tone, leaves less sludge on paper and allows easy removal of stains on undesired sites.

It is another object of the present invention to provide a water-based solid marking composition capable of rendering watercolor images.

It is another object of the present invention to provide a method for producing the water-based solid marking composition.

It is yet another object of the present invention to provide water-based marking instruments such as crayon pastels, crayons, colored pencils and markers containing the water-based solid marking composition.

In accordance with the present invention, the above and other objects can be accomplished by the provision of a water-based solid marking composition comprising water, a humectant and a solidifying agent, the weight ratio of water, the humectant and the solidifying agent being 2~3:1~2:1, and preferably 2.2~2.5:1.6~1.8:1.

In accordance with one aspect of the present invention, the above and other objects can be accomplished by the provision of a method for producing the water-based solid marking composition comprising:

a) dispersing a mixture of water, a dispersing agent and a pigment by stirring them;

b) further adding a humectant and water to the dispersed phase produced by the a) and heating at a temperature of from 60° C. to 80° C. while stirring; and c) further adding a solidifying agent to the stirred solution produced by the b) and heating at a temperature of from 60° C. to 80° C. while stirring;and In accordance with one aspect of the present invention, the above and other objects can be accomplished by the provision of a method for producing the water-based solid marking composition according to the present invention comprising:

a) stirring a mixture of water, a dispersing agent and a pigment to obtain a semi-finished pigment;

b) heating a mixture of water, a humectant and a solidifying agent at a temperature of from 60° C. to 80° C. while stirring; and c) adding the semi-finished pigment obtained in the a) to the mixture obtained in the b) and heating at a temperature of from 60° C. to 80° C. while stirring.

In the a) of obtaining the semi-finished pigment, a medium may be added to the mixture.

In accordance with one aspect of the present invention, the above and other objects can be accomplished by the provision of a water-based marking instrument comprising:

a water-based solid marking composition comprising water, a humectant and a solidifying agent, a body surrounding the water-based solid marking composition;

a packing for supporting the lower portion of the water-based solid marking composition and for assisting the movement of the water-based solid marking composition; and a screw facing the packing so as to move the packing upwardly and downwardly.

The water-based marking instrument according to the present invention further comprises an outer cap for sealing the water-based solid marking composition surrounded by the body.

Preferably, the outer cap has a sufficient length to completely cover the water-based solid marking composition.

The water-based marking instrument containing the water-based solid marking composition may be in the form of a crayon pastel, a crayon, a colored pencil or a marker.

BRIEF DESCRIPTION OF THE DRAWINGS

The above and other objects, features and other advantages of the present invention will be more clearly understood from the following detailed description taken in conjunction with the accompanying drawings in which.

DESCRIPTION OF THE PREFERRED EMBODIMENTS

Figure 1:
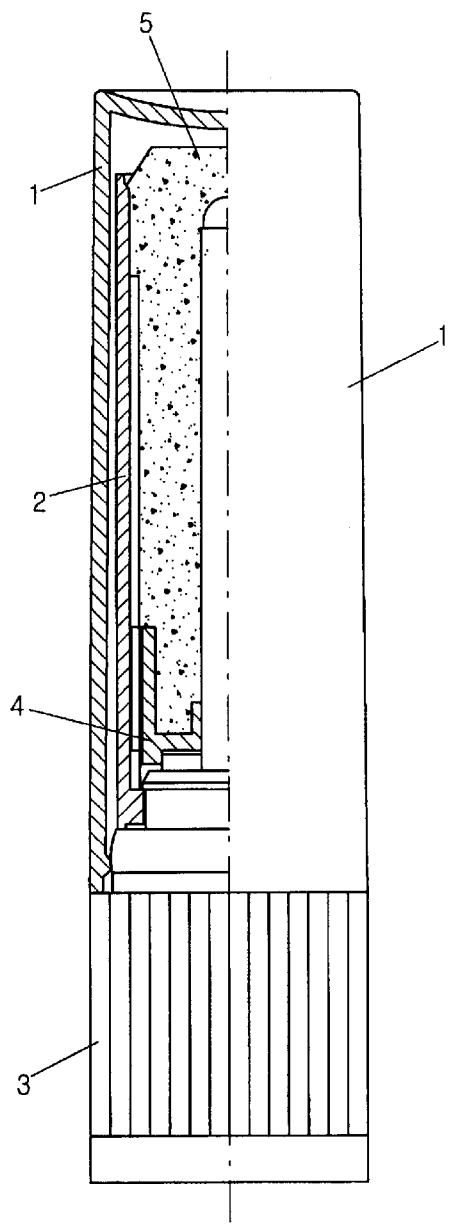
FIG. 1(a) is a half cross-sectional view showing the storage state of a water-based marking instrument according to one embodiment of the present invention.
FIG. 1(b) is a total cross-sectional view showing the disassembled state of the marking instrument of FIG. 1(a) upon its use.
Figure 1:
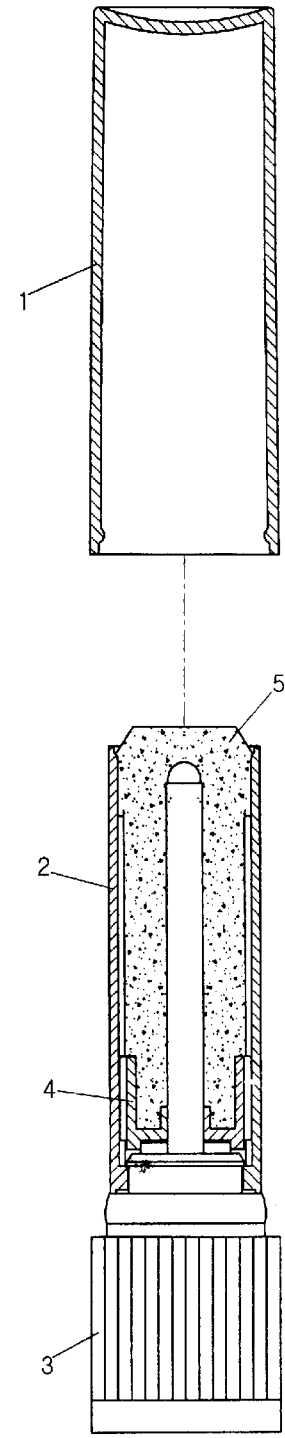

In order to select components suitable for use in the water-based solid marking composition, the components must meet the following criteria:

1. Colorant

Examples of the colorant usable in the present invention include dyes, pigments and colored polymers. Dyes must be selected considering their toxicity to the human body, original characteristics, compatibility with other components, chemical stability, in particular chemical fastness under outside environmental conditions, etc. Dyes have easy usability and excellent color miscibility. However, dyes are inferior to pigments in chemical stability. For the pigments, since pigments have low chemical reactivity, pigments can be relatively freely mixed with other components. However, the dispersion of pigments greatly affects physical properties of the end products. Accordingly, the selection of a dispersing agent and dispersing process is very important.

2. Solidifying Agent

Since water-soluble solidifying agents have excellent compatibility with water and they affect each other reversibly, and the solidifying agents must be selected considering a mixing ratio with water. Other solvents other than water can be selected considering the relationships between solidifying agents and the solvents. Examples of solidifying agents usable in the present invention include waxes, polyolefin-based polymers, metal salts of fatty acids such as soap, etc., but since the characteristics thereof are different from each other, solidifying agents must be selected considering applications of the end products.

3. Humectant

Humectants are used for maintaining appropriate water content in the marking composition according to the present invention and for assisting the quality of the marking composition according to the present invention. Accordingly, types and amount of humectants used must be determined through a number of experiments and inspections. Examples of the humectants usable in the present invention include low molecular weight polyethylene glycols, glycerin, propylene glycol, polysaccharides, sorbitol, etc., and the amount of the humectants used is in the range of from several %~several tens % by weight, based on the total weight of the marking composition.

Hereinafter, the water-based solid marking composition according to the present invention will be explained in more detail.

The water-based solid marking composition according to the present invention comprises water, a solidifying agent, a colorant(pigment), a dispersing agent, a medium, an additive, an extender pigment, a humectant, a defoaming agent, a preservative, etc. In particular, water, the humectant and the solidifying agent are present in the weight ratio of 2.2~2.5:1.6~1.8:1.

Components which constitute the marking composition according to the present invention will now be described in more detail.

1. Solidifying Agent

Solidifying agent is a main component crucial to determining physical properties of the marking composition according to the present invention. In order to achieve the object of the present invention, it is important to select preferable components and their combination ratio, for end product's excellent performances. Generally, a solidifying agent has its original physical strength and is likely to be self-agglomerated due to its crystallinity. Accordingly, the crystallinity of the solidifying agent must be adjusted to produce the preferred marking composition. In addition, since the marking composition according to the present invention contains some moisture, for stability of the end products, the ratio of solidifying agent to water must be carefully determined. When the ratio of the solidifying agent is relatively high, high-temperature stability of the marking composition according to the present invention is improved but usability becomes poor. On the contrary, when the ratio of water is relatively high, usability of the composition becomes better but high-temperature stability of the composition becomes poor. Considering storability and workability in addition to usability and high-temperature stability, water, the humectant and the solidifying agent are preferably present in the weight ratio of 2~3:1~2:1, and more preferably 2.2~2.5:1.6~1.8:1. At these ratios, it was confirmed through a panel test that the marking composition according to the present invention has excellent usability. It was also confirmed that the marking composition according to the present invention can be preserved without any changes even at a temperature of 70° C. for a long time period. When transporting in summer, the marking composition according to the present invention must endure in a container at a temperature of 70° C. or above. When the ratio of the solidifying agent is less than 1 in the above ratio of water: humectant:solidifying agent, high-temperature stability of the marking composition according to the present invention becomes poor, which causes many problems during storing and transporting the composition. When the ratio of the solidifying agent is more than 1, high-temperature stability is improved, but solidification is progressed to impair the usability of the end product. In addition, the hardness of the composition increases to reduce workability. On the other hand, when the ratio of the humectant is less than 1, moisturizing effect becomes poor. When the ratio of the humectant is more than 2, painting resistance can occur. In addition, the hardness of the composition increases, and a time taken to dry after application increases. On the other hand, when the ratio of water is less than 2, usability of the composition is unsatisfactory. When the ratio of water is more than 3, high-temperature stability becomes poor, and sludge is likely to occur when applied to paper. Accordingly, in the water-based solid marking composition according to the present invention, water, the humectant and the solidifying agent are preferably present in the weight ratio of 2~3:1~2:1, and more preferably 2.2~2.5:1.6~1.8:1.

Examples of the solidifying agent used in the marking composition according to the present invention include PEG (polyethylene glycol) 2000, 4000 and 6000 or mixtures thereof, sodium stearate, sodium palmitate, potassium myristate, sodium oleate, calcium palmitate, calcium stearate and mixtures thereof.

In the case of polyethylene glycol, mixing with other components requires high temperature (e.g., preferably 60° C.~80° C., and more preferably 65° C.~80° C). Also, polyethylene glycol requires an agent for inhibiting the crystallization of the mixture, which has relatively low polarity and good compatibility with PEG. Examples of the agent include polypropylene glycol, propylene glycol and polyethylene-based surfactants.

2. Colorant

Since colorant affects the color quality of the products, the selection and application of colorant are very important. Considering the stability of the marking composition and the preservation of images after drawing, physical and chemical stability of colorant are very important. In addition, since children use the marking composition of the present invention, the stability of colorant is not negligible. Accordingly, colorant used in the marking composition according to the present invention must meet the following requirements:

i) Colorant must have excellent compatibility with other components.

ii) Colorant must have excellent preservability so that no discoloration or decolorization occurs after painting a drawing.

iii) Colorant must be applied in a simple manner.

iv) Colorant must have low chemical reactivity so that no side reaction or other changes during storage.

v) Colorant must exhibit excellent color tone and texture.

Various materials may be used to express colors. Colorant can be classified into natural coloring matter and artificial coloring matter, edible coloring matter and industrial coloring matter, dye and pigment, etc. In particular, dye and pigment are tested to evaluate their suitability as components used in the present invention since they are used as most useful standard in technical view.

Since dye is dissolved in an appropriate solvent prior to use, it can be easily used, expresses excellent color tone and can be selected within relatively broad range. However, drawbacks of dye are that dye is likely to be discolored and the dye is inferior to pigment in chemical stability. In addition, since dye must be dissolved in water or solvent prior to use and thus large compensation of light refractive index could occur, a substrate to be drawn may show through the dye. Therefore, dye is not satisfactory as a painting material.

On the contrary, pigment has more advantages in terms of various selectivity, distinctiveness, coloration, concealability, light fastness, dispersibility, preservability, physical properties, chemical resistance, etc., than dye. However, since pigment has its own original characteristics, many data and experiments are required to select an appropriate pigment. Examples of preferred pigment usable in the marking composition according to the present invention include titanium dioxide, synthetic white, carbon black, lamp black, furnace black, Indian red, cobalt blue, Prussian blue, phthalocyanine green, etc. Preferable dispersing methods of pigments and their applications can be selected through other various trials.

3. Dispersing Agent

The selection and application of dispersing agent is very important like the selection of pigments when colorant is pigment. In addition, dispersing agent must be in harmony with medium. When the medium is used in a large amount, an experiment on the harmony of dispersing agent and medium must be performed previously. When medium has a strong polarity, side reaction with pigment or dispersing agent may occur. In the case of organic pigments, since they have a weak polarity and their primary particles are very small, dispersing agents having polymer structure are preferable in terms of dispersibility. When pigment, which is used to stabilize the dispersion through steric hindrance effects other than electrostatic repulsion, has a small particle size, a large amount of dispersing agent is used.

Examples of the dispersing agent for organic pigments usable in the marking composition include fatty acid alcohol ether derivatives of polyoxyethylene (POE), fatty acid ester derivatives of polyoxyethylene (POE), sugar ester, sorbitan fatty acid ester, fatty acid monoglyceride, etc.

In the case of inorganic pigments, their polarity is homogenized to induce electrostatic repulsion for effective dispersion. Examples of dispersing agent for inorganic pigments usable in the marking composition according to the present invention include acid esters, long chain polyamine amide salts, hydroxylated carboxylic acid esters, etc.

4. Medium

The selection of media is very important in view of its function and harmony with other components. Media are used to adhere other components such as pigment to a substrate. Most media are natural or synthetic polymers. Natural materials have advantages in safety and scarcity value. However, there are disadvantages that the purity of natural materials is low, and desired physical properties cannot be easily obtained. Synthetic polymers can be industrially mass-produced with a high purity and excellent physical properties. Synthetic polymers must be meet the following requirements:

(1) Synthetic polymers must be water-soluble.

(2) Synthetic polymers must have excellent compatibility with pigments.

(3) Synthetic polymers must have no toxicity.

(4) Synthetic polymers must be chemically stable.

Media having excellent compatibility with pigments are not easily obtained. Accordingly, the compatibility between media and pigments must be evaluated through a number of experiments. The evaluation is carried out as follows.

(1) Evaluation on Dispersibility

A mixture of a medium, a pigment and an appropriate amount of water is used to evaluate the suitability of the medium for the pigment by dispersing the mixture at the same time in accordance with the same procedure. First, a coated film having a predetermined thickness is formed. Appearance, gloss and color homogeneity of the coated film are determined by naked eyes or an appropriate apparatus. Further, the coated film is diluted with an excess of water to form another coated film. Appearance, gloss and color homogeneity of the coated film are determined by naked eyes or appropriate apparatuses.

(2) Evaluation on the Stability of Dilution

The mixture of a medium, a pigment and an appropriate amount of water is diluted with an excess of water. The dilution is poured into a measuring cylinder. The precipitation in the dilution is recorded every predetermined time.

(3) Evaluation on Storage Stability

The dilution is stored under different conditions (low temperature, room temperature, high temperature, etc.) for a long time period.

Preferred media are selected by the above experiment. Examples of preferred media usable in the marking composition include vinyl-based water soluble polymers, amide-based water soluble polymers, modified urethane-based water soluble polymers, gum arabic, gum xanthane, etc.

5. Additive

If necessary, in order to inhibit pigment from being precipitated and to produce a homogeneous marking composition, thickener may be added to the marking composition.

Thickener must not affect physical properties of the end product while inhibiting pigment from being precipitated. Examples of the thickener usable in the marking composition include synthetic functional polymers, cellulose derivatives, inorganic thickeners, etc. After carefully considering the characteristics of thickeners, a preferable thickener must be selected. Since inorganic thickeners must be dispersed by stirring at high speed, thickeners showing satisfactory effects even through a simple other than inorganic thickeners stirring are preferable.

Specific examples of the thickener usable in the marking composition include ACRYSOL ASE 60 TYPE (ROHM & HAAS), ACRYSOL TT-615 (ROHM & HAAS), ACRYSOL TT-935 (ROHM & HAAS), polyurethane such as RM-825 (ROHM & HAAS), PUR 61 (Münzing), RHEOLATE 288 (Rheox), cellulose such as hydroxyethylcellulose, carboxymethylcellulose, methylcellulose, inorganic thickeners such as bentonite, etc.

In addition, since the marking composition according to the present invention contains water, the use of preservative is necessary. Accordingly, preservative must be low toxic and biochemically degradable while showing satisfactory preservative effects. Possible variables during production of the end product must be considered.

6. Extender Pigment

Extender pigment in addition to pigment as a colorant is necessary. Particularly, in the water-based composition, extender pigment should be selected with more attention than in oily product. In addition, the use of extender requires wetting agent and additional wetting process. Furthermore, the use of extender can cause a change in pH and other physical properties. For the production of the composition according to the present invention, wetting-dispersing step is carried out separately from other process. Examples of extender usable in the marking composition according to the present invention include clay, calcium carbonate, silica, talc, etc. In particular, talc is useful for improving soft paintability of the marking composition and for preventing the composition from feeling sticky in a user's hands. However, increase in viscosity of the composition by the addition of oil-absorptive extender must be resolved. In addition, since precipitation can occur during production of the marking composition, a small amount of extender is preferably used. To minimize oil absorption of extender and changes in the physical properties of the end product, surface-treated extenders are preferable.

Hereinafter, the method for producing the water-based solid marking composition according to the present invention will be explained in more detail.

The effective dispersion of pigment is a main factor affecting the quality of the marking composition according to the present invention. When the dispersion of pigment is not effectively carried out, the precipitation of pigment may occur during production of the marking composition according to the present invention. In addition, it is difficult to obtain good color tone, and larger amount of pigment must be used. Furthermore, problems such as loss of gloss, poor appearance, poor storability, occurrence of air bubble, etc., can arise. In order to disperse pigment, desirable pigment and dispersing agent must be selected and effective dispersing process is required. The method for producing marking composition according to the present invention needs to have a separate process for dispersing. In accordance with the present invention, the particle size of pigment is preferably in the range of 6~7 HEGMAN (below 20 µm). In the range of 0.05~0.5 µm, pigment has excellent coloring, concealability and light fastness, so most of pigment currently are produced within the size range. When the size is not larger than 0.1 µm, most particles of pigment are self-agglomerated. The agglomerate may be in the form of face-to-face, edge-to-edge, vertex-to-vertex or edge-vertex agglomeration. Accordingly, by considering such forms of the agglomerate, the method for dispersion of pigment must be selected and the degree of dispersion of pigment must be determined.

In accordance with the present invention, two methods for producing the water-based solid marking composition are described.

The first method is most general method. This method comprises the step of adding each component sequentially. That is, pigment is dispersed, and then other components are added to the dispersed phase. This method is useful for marking compositions expressing special colors not frequently used.

The second method comprises the steps of obtaining a semi-finished pigment and mixing other components with the semi-finished pigment. This method has a disadvantage that it takes a long time to obtain the semi-finished pigment. Also, this method requires an apparatus for dispersing pigment and an apparatus for mixing. This method is useful for marking compositions expressing general colors frequently used. In addition, this method is useful for mass-production of marking compositions.

Hereinafter, the water-based marking instruments according to the present invention will be explained in more detail with reference to the accompanying drawings.

FIG. 1(a) is a half cross-sectional view showing the storage state of the water-based marking instrument according to one embodiment of the present invention.

As shown in FIG. 1(a), the water-based marking instrument according to the present invention comprises:

a water-based solid marking composition (5) comprising water, a humectant and a solidifying agent;

a body (2) surrounding the water-based solid marking composition;

a packing (4) for supporting the lower portion of the composition (5) when moving the water-based solid marking composition upwardly; and a screw (3) facing the packing so as to move the packing (4) upwardly and downwardly.

The water-based marking instrument according to the present invention further comprises an outer cap (1) for covering the water-based solid marking composition. The outer cap (1) inhibits the water-based solid marking composition from being evaporated and prevents dust and insects from entering.

FIG. 1(b) is a total cross-sectional view showing the disassembled state of the marking instrument of FIG. 1(a) upon its use.

As shown in FIG. 1(b), the outer cap (1) is separated from the water-based marking instrument. Subsequently, the screw (3) is rotated to protrude the composition (5) supported by the packing (4). At this time, a user can protrude the composition (5) as high as he wants, so there is no danger for the composition to be cut. When drawing a painting is finished, the screw (3) is rotated in a reverse direction to withdraw the composition (5), and the outer cap (1) is closed to store the composition (5).

Figure 2:
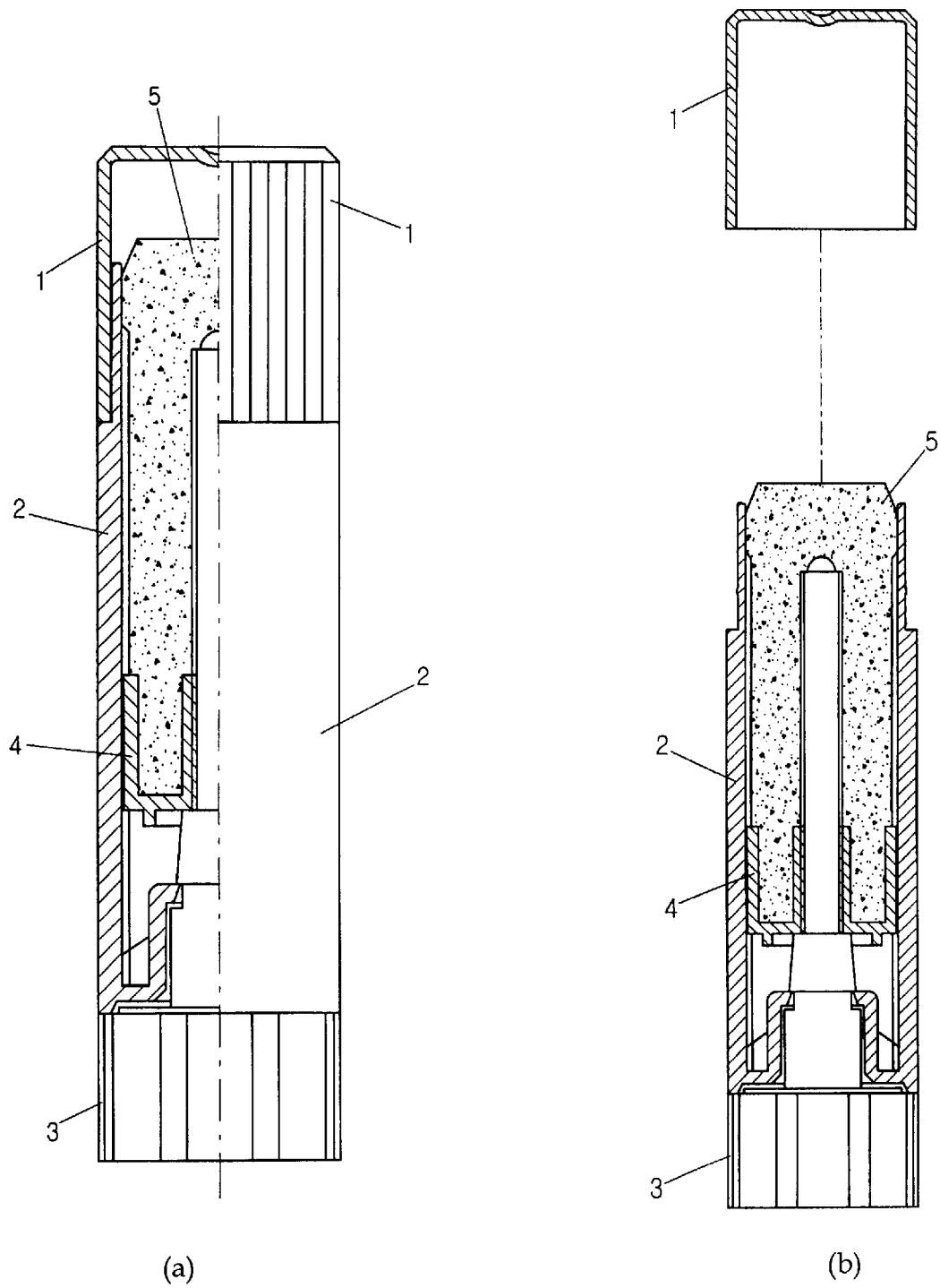
FIG. 2(a) is a half cross-sectional view showing the storage state of a water-based marking instrument according to another embodiment of the present invention.
FIG. 2(b) is a total cross-sectional view showing the disassembled state of the marking instrument of FIG. 2(a) upon its use.

FIG. 2(a) is a half cross-sectional view showing the storage state of the water-based marking instrument according to another embodiment of the present invention.

As shown in FIG. 2(a), the water-based marking instrument is different from the water-based marking instrument of FIG. 1(a), in the length of the outer cap (1). Since there is a danger that children may swallow the water-based solid marking composition (5), the outer cap preferably has a length capable of completely covering the composition (5).

FIG. 2(b) is a total cross-sectional view showing the disassembled state of the marking instrument of FIG. 2(a) upon its use.

The water-based marking instrument can be made of plastic, metals, etc.

Since all of the portions which users touch in the water-based marking instrument according to the present invention are made of plastics or metals, it can prevent the composition from feeling sticky in a user's hands. In addition, since the water-based marking instrument according to the present invention can be refilled with the marking composition, it conserves resources and protects our environment.

The water-based solid marking composition and the method thereof according to the present invention are illustrated in greater detail below with reference to Examples. These Examples are provided only for illustrative purposes, but are not to be construed as limiting the scope of the present invention.

EXAMPLE

EXAMPLE 1

Components shown in Table 1 were sequentially added, and the mixture was stirred in accordance with the procedure as described in Table 1.

TABLE 1

| Components | Weight % |
|---|---|
| Medium | 2.0~3.0 |
| Water | 20.0~25.0 |
| Dispersing agent | 1.0~3.0 |
| Defoaming agent | 0.15~0.2 |
| Pigment | 5.0~10.0 |
| Dispersing after stirring at high speed. | |
| Humectant agent | 25.0~35.0 |
| Water | 15.0~20.0 |
| Defoaming agent | 0.05~0.1 |
| Stirring homogeneously while heating at 60~80° C. | |
| Solidifying agent | 15.0~20.0 |
| Stirring homogeneously while heating at 60~80° C. | |
| Preservative | 0.1~0.3 |
| Total | 100.0 |

EXAMPLE 2

First, a semi-finished pigment was obtained using components as shown in Table 2. Subsequently, components shown in Table 3 were sequentially added to the semi-finished pigment, and then the mixture was stirred to produce a water-based solid marking composition.

TABLE 2

| Components | Weight % |
|---|---|
| Water | 50.0~80.0 |
| Dispersing agent | 3.0~10.0 |
| Defoaming agent | 0.5~1.0 |
| Pigment | 20.0~40.0 |
| Additive | 1.0~2.0 |
| Preservative | 0.5~1.0 |
| Total | 100.00 |

Specifically, a dispersing agent used in this Example required no medium. The dispersing agent was used in an amount of 20~50 PHR, based on the weight of pigment. Water, the dispersing agent and a defoaming agent were sequentially added to a container while homogeneously stirring, and then a pigment was added thereto. Thereafter, The mixture was strongly stirred for 15~30 minutes. An additive was added to the mixture, homogeneously stirred, and dispersed to obtain a degree of dispersion not less than 7 HEGMAN. Subsequently, after the mixture was allowed to cool to room temperature, a preservative was added thereto, and the mixture was homogeneously stirred to obtain a semi-finished pigment. The semi-finished pigment thus obtained was mixed with components shown in Table 3, and then the mixture was homogenously stirred to produce a water-based solid marking composition.

TABLE 3

| Components | Weight % |
|---|---|
| Water | 23.0~30.0 |
| Humectant agent | 20.0~30.0 |
| Solidifying agent | 10.0~20.0 |
| Stirring homogeneously while heating at 60~80° C. | |
| Medium | 1.0~3.0 |
| Defoaming agent | 0.1~0.2 |
| Semi-finished pigment | 5.0~20.0 |
| Additive | 0.5~1.0 |
| Preservative | 0.1~0.2 |
| Stirring homogeneously while heating at 60~80° C. | |
| Total | 100.0 |

EXAMPLE 3

Components shown in Table 4 were sequentially added, and then the mixture was stirred to obtain a semi-finished pigment. In accordance with the procedure as described in Table 5, a water-based solid marking composition was produced from the semi-finished pigment.

TABLE 4

| Components | Weight % |
|---|---|
| Water | 30.0~5.0 |
| Dispersing agent | 3.0~10.0 |
| Humectant | 5.0~15.0 |
| Medium | 5.0~10.0 |
| Defoaming agent | 0.5~1.0 |
| Pigment | 20.0~30.0 |
| Additive | 1.0~2.0 |
| Preservative | 0.5~1.0 |
| Total | 100.00 |

Specifically, a dispersing agent used in this Example required a medium. The dispersing agent was used in an amount of 10~50 PHR, based on the weight of pigment. Water, the dispersing agent and a defoaming agent were sequentially added to a container and then homogenously stirred. Thereafter, a pigment was added thereto, and then the mixture was strongly stirred for 15~30 minutes. An additive was added to the mixture, homogeneously stirred, and dispersed to obtain a degree of dispersion not less than 7 HEGMAN. Subsequently, after the mixture was allowed to cool to room temperature, a preservative was added thereto, and homogeneously stirred to obtain a semi-finished pigment. The semi-finished pigment thus obtained was mixed with components shown in Table 5, and then homogenously stirred to. produce a water-based solid marking composition.

TABLE 5

| Components | Weight % |
|---|---|
| Water | 23.0~30.0 |
| Humectant | 20.0~30.0 |
| Solidifying agent | 10.0~20.0 |
| Stirring homogeneously while heating at 60~80° C. | |
| Medium | 1.0~3.0 |
| Defoaming agent | 0.1~0.2 |
| Semi-finished pigment | 5.0~20.0 |
| Additive | 0.5~1.0 |
| Preservative | 0.1~0.2 |
| Stirring homogeneously while heating at 60~80° C. | |
| Total | 100.00 |

As can be seen from the foregoing, the water-based solid marking composition according to the present invention has advantages in color miscibility, affinity to paper, usability, color tone, the amount of sludge on paper and removal of stains on undesired sites. The water-based solid marking composition according to the present invention can render watercolor images even using a crayon pastel, a crayon, a colored pencil or a marker. In other words, the composition can induces watercolor images by applying to a substrate and then rubbing with a brush wetted by water. The water-based marking instrument containing the water-based solid marking composition can prevent the composition from feeling sticky in a user's hands can contain a large amount of the composition. In addition, since the water-based marking instrument can be refilled with the marking composition, it conserves resources and protects our environment. Further, since the outer cap has a length capable of completely covering the water-based solid marking composition, there is no danger that children may swallow the composition.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A water-based solid marking composition comprising:
   water;
   a humectant; and
   a solidifying agent,
   wherein the water, the humectant and the solidifying agent are present in the weight ratio of 2~3:1~2:1.

2. The water-based solid marking composition according to claim 1, wherein the water, the humectant and the solidifying agent are present in the weight ratio of 2.2~2.5:1.6~1.8:1.

3. A method for producing the water-based solid marking composition according to claim 2, comprising:
   a) dispersing a mixture of water, a dispersing agent and a pigment by stirring them;
   b) further adding a humectant and water to the dispersed phase produced by the a) and heating at a temperature of from 60° C. to 80° C. while stirring; and
   c) further adding a solidifying agent to the stirred solution produced by the b) and heating at a temperature of from 60° C. to 80° C. while stirring.

4. A method for producing the water-based solid marking composition according to claim 2, comprising:
   a) stirring a mixture of water, a dispersing agent and a pigment to obtain a semi-finished pigment;
   b) heating a mixture of water, a humectant and a solidifying agent at a temperature of from 60° C. to 80° C. while stirring; and
   c) adding the semi-finished pigment obtained in the a) to the mixture obtained in the b) and heating at a temperature of from 60° C. to 80° C. while stirring.

5. The method for producing the water-based solid marking composition according to claim 4, wherein the a) further comprises adding a medium to the mixture.

6. A water-based marking instrument comprising:
   a water-based solid marking composition according to claim 2;
   a body surrounding the water-based solid marking composition;
   a packing for supporting the lower portion of the water-based solid marking composition and for assisting the movement of the water-based solid marking composition; and
   a screw facing the packing so as to move the packing upwardly and downwardly.

7. The water-based marking instrument according to claim 6, further comprising an outer cap for covering the water-based solid marking composition surrounded by the body.

8. The water-based marking instrument according to claim 7, wherein the outer cap has a sufficient length to completely cover the water-based solid marking composition.

9. The water-based marking instrument according to claim 8, having the form of a crayon pastel, a crayon, a colored pencil or a marker.

10. The water-based marking instrument according to claim 7, having the form of a crayon pastel, a crayon, a colored pencil or a marker.

11. The water-based marking instrument according to claim 6, having the form of a crayon pastel, a crayon, a colored pencil or a marker.

12. A method for producing the water-based solid marking composition according to claim 1, comprising:
   a) dispersing a mixture of water, a dispersing agent and a pigment by stirring them;
   b) further adding a humectant and water to the dispersed phase produced by the a) and heating at a temperature of from 60° C. to 80° C. while stirring; and
   c) further adding a solidifying agent to the stirred solution produced by the b) and heating at a temperature of from 60° C. to 80° C. while stirring.

13. A method for producing the water-based solid marking composition according to claim 1, comprising:
   a) stirring a mixture of water, a dispersing agent and a pigment to obtain a semi-finished pigment;
   b) heating a mixture of water, a humectant and a solidifying agent at a temperature of from 60° C. to 80° C. while stirring; and
   c) adding the semi-finished pigment obtained in the a) to the mixture obtained in the b) and heating at a temperature of from 60° C. to 80° C. while stirring.

14. The method for producing the water-based solid marking composition according to claim 13, wherein the a) further comprises adding a medium to the mixture.

15. A water-based marking instrument comprising:
- a water-based solid marking composition according to claim 1;
- a body surrounding the water-based solid marking composition;
- a packing for supporting the lower portion of the water-based solid marking composition and for assisting the movement of the water-based solid marking composition; and
- a screw facing, the packing so as to move the packing upwardly and downwardly.

16. The water-based marking instrument according to claim 15, further comprising an outer cap for covering the water-based solid marking composition surrounded by the body.

17. The water-based marking instrument according to claim 16, wherein the outer cap has a sufficient length to completely cover the water-based solid marking composition.

18. The water-based marking instrument according to claim 17, having the form of a crayon pastel, a crayon, a colored pencil or a marker.

19. The water-based marking instrument according to claim 16, having the form of a crayon pastel, a crayon, a colored pencil or a marker.

20. The water-based marking instrument according to claim 15, having the form of a crayon pastel, a crayon, a colored pencil or a marker.

* * * * *